Nov. 24, 1925.
G. F. PIERCE
1,562,913
AUTOMATIC CANDY MAKING AND PEANUT MACHINE
Filed Aug. 5, 1922
2 Sheets-Sheet 1
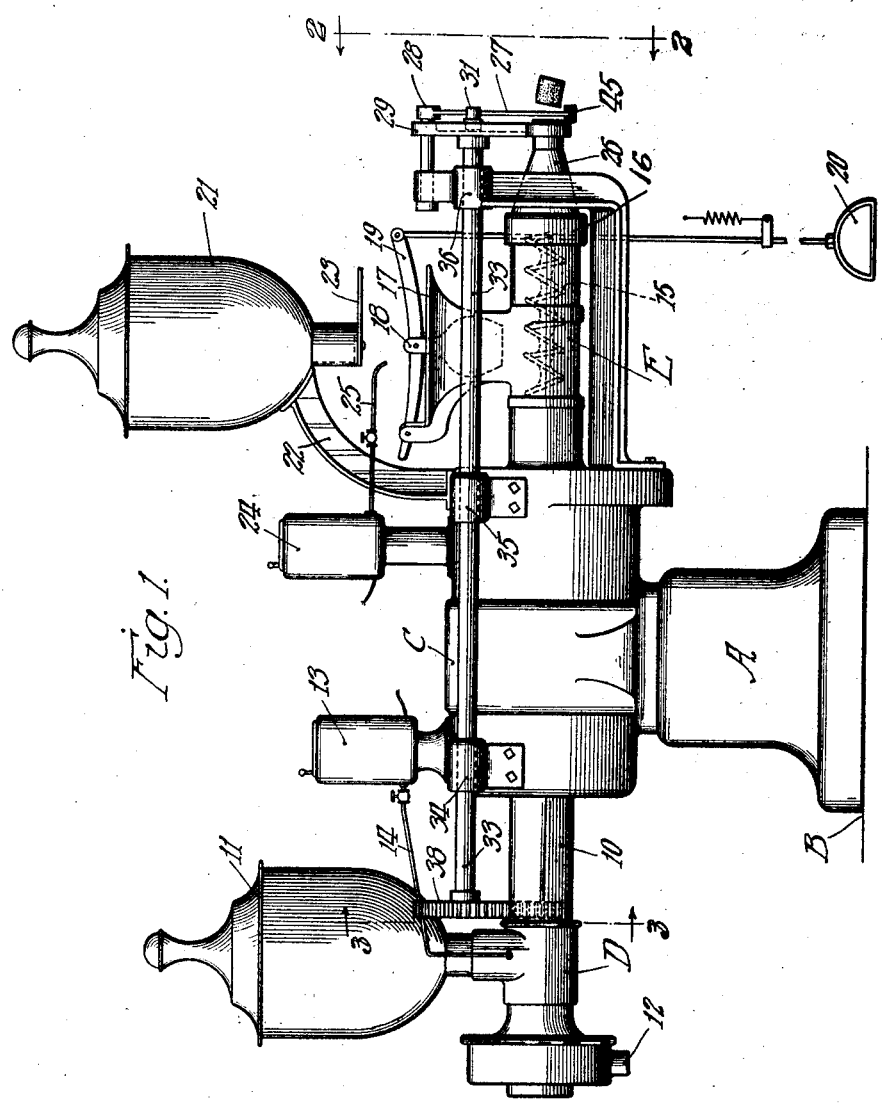
Inventor.
George Frank Pierce.
By Gabel + Mueller
Attys.

Nov. 24, 1925.
G. F. PIERCE
1,562,913
AUTOMATIC CANDY MAKING AND PEANUT MACHINE
Filed Aug. 5, 1922
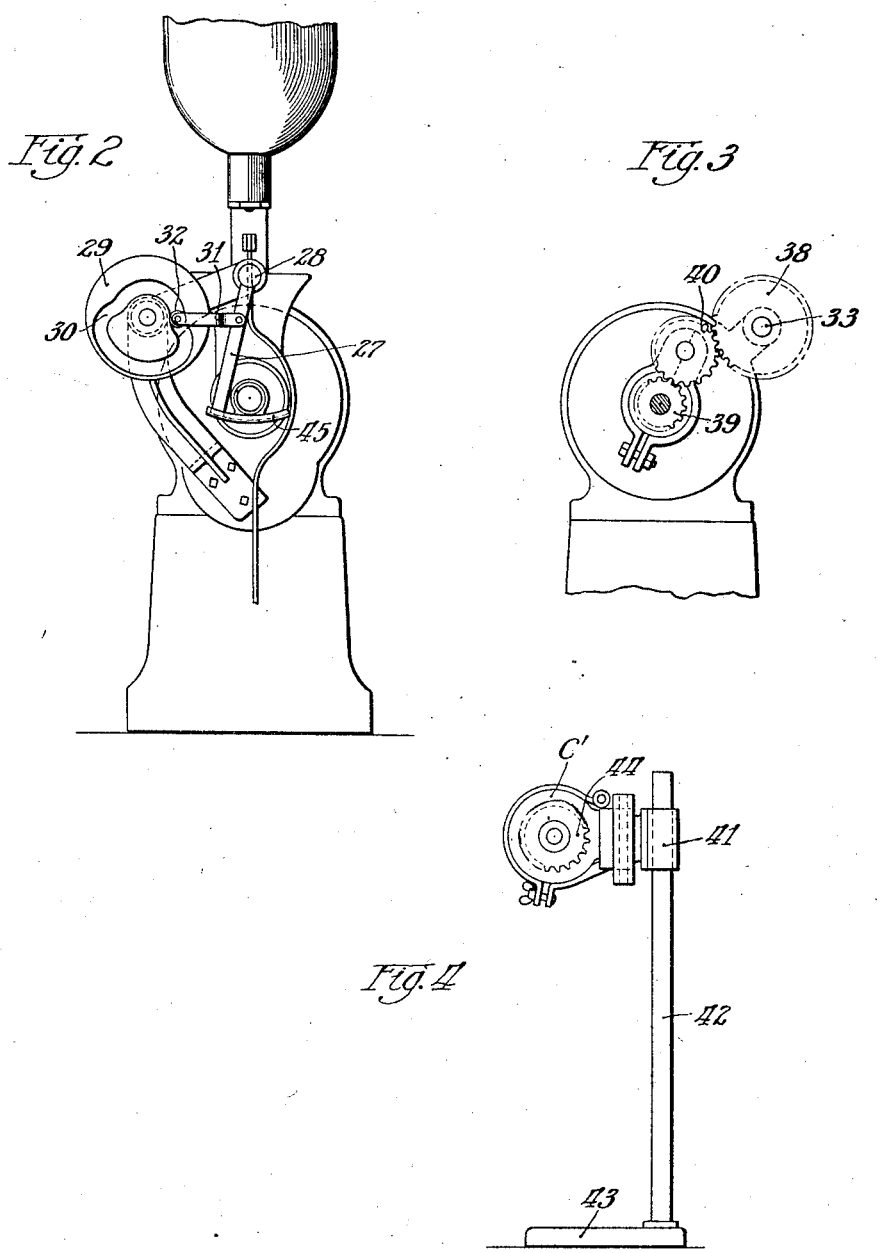
Inventor
George Frank Pierce
By Gabel & Mueller
attys.

Patented Nov. 24, 1925.

1,562,913

UNITED STATES PATENT OFFICE.

GEORGE FRANK PIERCE, OF CHICAGO, ILLINOIS.

AUTOMATIC CANDY-MAKING AND PEANUT MACHINE.

Application filed August 5, 1922. Serial No. 579,885.

*To all whom it may concern:*

Be it known that I, GEORGE FRANK PIERCE, a citizen of the United States, residing at Chicago, in the county of Cook and State of Illinois, have invented a certain new and useful Improvement in Automatic Candy-Making and Peanut Machines, of which the following is a full, clear, concise, and exact description, reference being had to the accompanying drawings, forming a part of this specification.

My invention relates to automatic candy making and peanut machines, an object being to provide an improved and simplified unit machine of this character. One of the features of my invention is the provision of a unitary structure having an intermediate driving motor with a removable peanut-butter machine secured at one end of the motor frame and driven thereby and an automatic candy making and cutting machine at the other end of the motor, arranged to be simultaneously operated thereby. Another feature of my invention is the provision of a candy making machine in the form of a mixer, grinder and feeder adapted to mix, chop up and compress ingredients such as nuts, raisins, and sweetened water which are then driven through a forming device such as a funnel, out of which it is forced in a continuous length and automatically chopped off into desired sections.

For a better understanding of my invention reference is to be had to the accompanying drawings in which Fig. 1 is a side elevation of the preferred form of my invention;

Fig. 2 is a right end view along the line 2—2 of Fig. 1;

Fig. 3 is a left end view along the line 3—3 of Fig. 1, showing the gearing connection for driving the automatic cut-off; and Fig. 4 shows a separate stand and motor for driving the cut-off independent of the main motor.

Referring now more in detail to my invention as illustrated, it comprises a pedestal A mounted upon a table B and supporting an electric motor C, to one end of which is attached a peanut-butter or grinding machine comprising a grinder D which may be of any of the standard forms adapted to be fastened to the hub 10 of the motor frame. At the top of the grinder D is the receiving can 11 adapted to feed the nuts to the mill D where they are ground and forced out of the mouth 12. I also provide an oil supply in the form of an electrically heated receptacle 13 having a valve controlled tube 14 running from the receptacle into the mill D so that a suitable oil may be fed to the peanuts as they are ground and formed into the peanut-butter.

Now as to the candy machine shown at the right end of the motor in Fig. 1, this comprises a mill E having a feed worm 15 with the usual cutter knife and pierced cutter plate end 16 mounted thereon so that as the ingredients are fed down through the hopper 17 they are forced along by the screw 15 and cut up and compressed as they are driven through the openings in the cutter plate. The hopper 17 has a plunger 18 therein connected to the lever 19, operated preferably by a spring retrieving foot treadle 20. Above the hopper 17 is a receiving can 21 supported on the motor frame by an arm 22 and having a regulating outlet valve 23 so as to vary the feed. I also provide a receptacle 24 having a valve controlled tube 25 for feeding a suitable fluid to the mixture in the mill.

The ingredients used in mixing up the candy comprises preferably raisins and nuts which are placed in the receiving can 21 and fed to the hopper with a sweetened water through the tube 25. These ingredients all feed continuously into the hopper and are pressed downwardly into the mill by the plunger 18. When the plunger is down in the position shown in the drawing the ingredients drop down around the plunger and the hopper is large enough so that as the plunger is retracted upwardly the ingredients drop down around the plunger to again fill the hopper so that it may be pressed downwardly to continue the forced feed. By means of the forced feed and continuously fed hopper I am enabled to secure a greater output of the machine, although it will be apparent that the machine may be operated with or without the feeding plunger.

At the end of the candy machine I provide forming and cutting mechanism, and to this end apply a funnel shaped device 26 through which the compressed and mixed ingredients are forced after they are cut up. The mixture then comes out in the form of a continuous roll or strip which is automatically cut off into desired lengths. To this end I provide cutting mechanism including a reciprocable two-edge knife 27 pivotally supported at 28 and adapted to be moved back and forth across the face of the former 26, each movement cutting off a length of the mixture. In order to drive the cutting knife 27 I provide a rotatable cam 29 having a slot 30 therein so shaped as to hold the knife to either one side or the other of the former for the greater part of a half of a revolution and then quickly driving the knife through the roll. The knife is connected to the cam by a link 31 having a roller 32 at the end thereof riding in the slot 30. The cam 29 is mounted at the end of a rotatable shaft 33 supported in bearings 34—35—36 and adapted to be driven either from the shaft of the motor C as shown in Fig. 3 or by a separate driving motor shown in Fig. 4. This driving shaft 33 is also arranged so that it may be rotated at different speeds compared with the speed of the mill thereby varying the cutting periods of the cutting knife compared with the mill feed so as to sever the candy roll into different lengths as desired. In order to effect such variable rotation of the shaft 33, different size gears are used, the driven gear 38 being removably placed on the shaft 33 and adapted to be connected to the driving gear 39 on the end of the motor shaft by means of an adjustable idler 40. The driving gear 39 is also interchangeable to different sizes. This gear is shown dotted in Fig. 1 as it is preferably used when the mill D is removed, at which time the desired gear 39 is placed on the end of the motor shaft to operate the knife. It is to be noted that the lower end of the knife slides in a slotted bracket 45 to prevent the knife from being pushed outwardly when cutting while the roll is being fed out.

If it is desired to run both the peanut-butter machine D and candy machine E at the same time, and drive the cutting mechanism independent of the main motor C, the separate driving motor C' of Fig. 4 is used, this motor being clamped to a bracket 41 adjustable upon a standard 42, held by a base plate 43 adapted to be supported upon the base B with the driving gear 44 in mesh with the gear 38 on the cam shaft 33. When the separate driving motor is used, main motor driving gearing is disconnected from gear 38.

What I claim as new and desire to secure by United States Letters Patent is:

1. In a candy machine of the character described, a single unitary structure comprising a motor and casing supported by an integral base, a mill containing a feed worm, a cutting knife and guide for the knife all mounted upon and supported by the motor casing above the base, a hopper for the mill, a receiving can mounted on the casing above the hopper for feeding nuts and raisins thereto, a fluid receptacle attached to the casing for feeding sweetened water or the like to the mill whereby the fed ingredients are ground up and thoroughly mixed, a spring retracted foot operating treadle actuated plunger for forcing the fed ingredients through the hopper into the mill at the will of the operator, a tube at the mouth of the mill through which the mixed matter is forced into a continuous strip, and driving mechanism supported by the casing for automatically operating the cutting knife for cutting the strip into desired lengths, said driving mechanism including a shaft supported alongside the motor casing and connected to the motor at one end and to the cutting knife at the other end for actuating the same.

2. A machine of the character described comprising, a motor and casing having a base, a mill secured to one end of the casing having a mixing feed worm connected to the end of the motor shaft and a tube at the mouth of the mill through which the mixed matter is forced into a continuous strip, a cutter shaft mounted on the side of the casing rotatably connected with the motor shaft at the other end of the casing, a bracket attached to the casing extending to the end of the mill tube and supporting the end of the cutter shaft, a cam mounted on the cutter shaft, a knife pivotally suspended at a point above the mill tube upon an extension of said bracket, a guide in which the lower end of the knife slidingly reciprocates, and a link extending from the cam to the knife to effect alternate rests and reciprocations of the knife past the tube to sever the strip into desired pieces.

In witness whereof, I hereunto subscribe my name this 12th day of July, A. D. 1922.

GEORGE FRANK PIERCE.